United States Patent
Hato et al.

(10) Patent No.: US 11,189,250 B2
(45) Date of Patent: Nov. 30, 2021

(54) DISPLAY CONTROL DEVICE AND DISPLAY CONTROL METHOD

(71) Applicant: DENSO CORPORATION, Kariya (JP)

(72) Inventors: Takeshi Hato, Kariya (JP); Takeshi Kawashima, Kariya (JP); Daisuke Takemori, Kariya (JP); Hiroto Banno, Kariya (JP); Akira Kamiya, Kariya (JP); Shingo Yamashita, Kariya (JP); Shunsuke Shibata, Nisshin (JP); Masayuki Imanishi, Nisshin (JP); Norio Samma, Nisshin (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/508,558

(22) Filed: Jul. 11, 2019

(65) Prior Publication Data

US 2019/0333481 A1    Oct. 31, 2019

Related U.S. Application Data

(63) Continuation of application No. PCT/JP2018/000928, filed on Jan. 16, 2018.

(30) Foreign Application Priority Data

Feb. 28, 2017  (JP) .............................. JP2017-036127

(51) Int. Cl.
*G09G 5/38* (2006.01)
*B60R 1/00* (2006.01)
*G02B 27/01* (2006.01)

(52) U.S. Cl.
CPC ............... *G09G 5/38* (2013.01); *B60R 1/001* (2013.01); *G02B 27/0101* (2013.01);
(Continued)

(58) Field of Classification Search
CPC ............. G09G 5/38; G09G 2320/0261; G09G 2380/10; G09G 3/002; G09G 5/00;
(Continued)

(56) References Cited

U.S. PATENT DOCUMENTS

| | | |
|---|---|---|
| 5,539,640 A | 7/1996 | Kishimoto et al. |
| 5,572,252 A * | 11/1996 | Naka .................... G11B 31/006 |
| | | 348/208.16 |

(Continued)

FOREIGN PATENT DOCUMENTS

| | | | | |
|---|---|---|---|---|
| DE | 112015001543 T5 * | 12/2016 | ............... | B60R 1/00 |
| JP | H05221211 A | 8/1993 | | |

(Continued)

*Primary Examiner* — Thai Q Tran
*Assistant Examiner* — Nienru Yang
(74) *Attorney, Agent, or Firm* — Harness, Dickey & Pierce, P.L.C.

(57) ABSTRACT

A display control device for controlling a display position of a virtual image displayed and superimposed on a foreground in a vehicle (A), includes: an information acquisition unit for acquiring state information of the vehicle and extracting attitude change information and vibration information of the vehicle from the state information; a position correction unit for correcting a displacement of the display position of the virtual image with respect to the foreground caused by the attitude change of the vehicle, based on the attitude change information; a rough road determination unit for determining whether a road is a rough road, the road on which the vehicle is traveling or scheduled to travel, based on the vibration information; and a correction suppression unit for suppressing a correction control of the display position executed by the position correction unit and continuing to display the virtual image, based on a rough road determination.

11 Claims, 13 Drawing Sheets

(52) U.S. Cl.
CPC ....... *B60Y 2200/11* (2013.01); *B60Y 2400/92* (2013.01); *G09G 2380/10* (2013.01)

(58) Field of Classification Search
CPC .. G09G 2340/0464; B60R 1/001; B60R 1/00; G02B 27/0101; G02B 2027/0183; G02B 2027/0198; G02B 27/01; B60K 35/00; B60K 2370/191; B60K 2370/06; B60K 2370/31; B60K 2370/155; B60K 2370/1529; B60K 2370/334; B60K 2370/347; B60K 2370/177; B60K 2370/66; B60Y 2200/11; B60Y 2400/92
USPC ....................................................... 348/115
See application file for complete search history.

(56) References Cited

U.S. PATENT DOCUMENTS

| | | | |
|---|---|---|---|
| 2015/0221066 A1* | 8/2015 | Kobayashi | G06T 7/194 |
| | | | 382/284 |
| 2016/0167647 A1 | 6/2016 | Yamada et al. | |
| 2016/0216521 A1* | 7/2016 | Yachida | G02B 27/0179 |
| 2016/0371813 A1* | 12/2016 | Fujie | G02B 27/01 |
| 2017/0038595 A1* | 2/2017 | Kutomi | G09G 5/38 |
| 2017/0274896 A1 | 9/2017 | Yamada et al. | |

FOREIGN PATENT DOCUMENTS

| | | |
|---|---|---|
| JP | 2008183971 A | 8/2008 |
| JP | 2015132352 A | 7/2015 |
| JP | 2015202842 A | 11/2015 |
| JP | 2017087826 A | 5/2017 |
| WO | WO-2015128985 A1 | 9/2015 |

\* cited by examiner

DISPLAY CONTROL DEVICE AND DISPLAY CONTROL METHOD

CROSS REFERENCE TO RELATED APPLICATIONS

The present application is a continuation application of International Patent Application No. PCT/JP2018/000928 filed on Jan. 16, 2018, which designated the United States and claims the benefit of priority from Japanese Patent Application No. 2017-036127 filed on Feb. 28, 2017. The entire disclosures of all of the above applications are incorporated herein by reference.

TECHNICAL FIELD

The present disclosure relates to a display control device and a display control method for controlling a display position of a virtual image displayed and superimposed on a foreground scenery from an occupant of a vehicle.

BACKGROUND

A head-up display device (hereinafter referred to as "HUD device") for displaying and superimposing a virtual image on a foreground scenery viewed from an occupant is known. One type of such HUD device, for example, has a configuration for displaying video information at a display position suitable for a vehicle condition. Specifically, the HUD device acquires the information such as a triaxial gyro sensor indicative of the vehicle condition, and moves the display position of the virtual image so as to secure the driver's field of view in case of an uphill slope, a downhill slope or the like. In addition, the HUD device determines whether the vehicle is traveling on a rough road with changing an attitude of the vehicle largely. When it is determined that the vehicle is traveling on a rough road, the display of the virtual image is prohibited.

SUMMARY

A display control device and a display control method for controlling a display position of a virtual image displayed and superimposed on a foreground seen from an occupant in a vehicle, provide: acquiring state information of the vehicle and extracting attitude change information and vibration information of the vehicle from the state information; determining whether a road is a rough road; correcting a displacement of the display position of the virtual image with respect to the foreground; and suppressing a correction control of the display position of the virtual image and continue to display the virtual image, based on a rough road determination.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
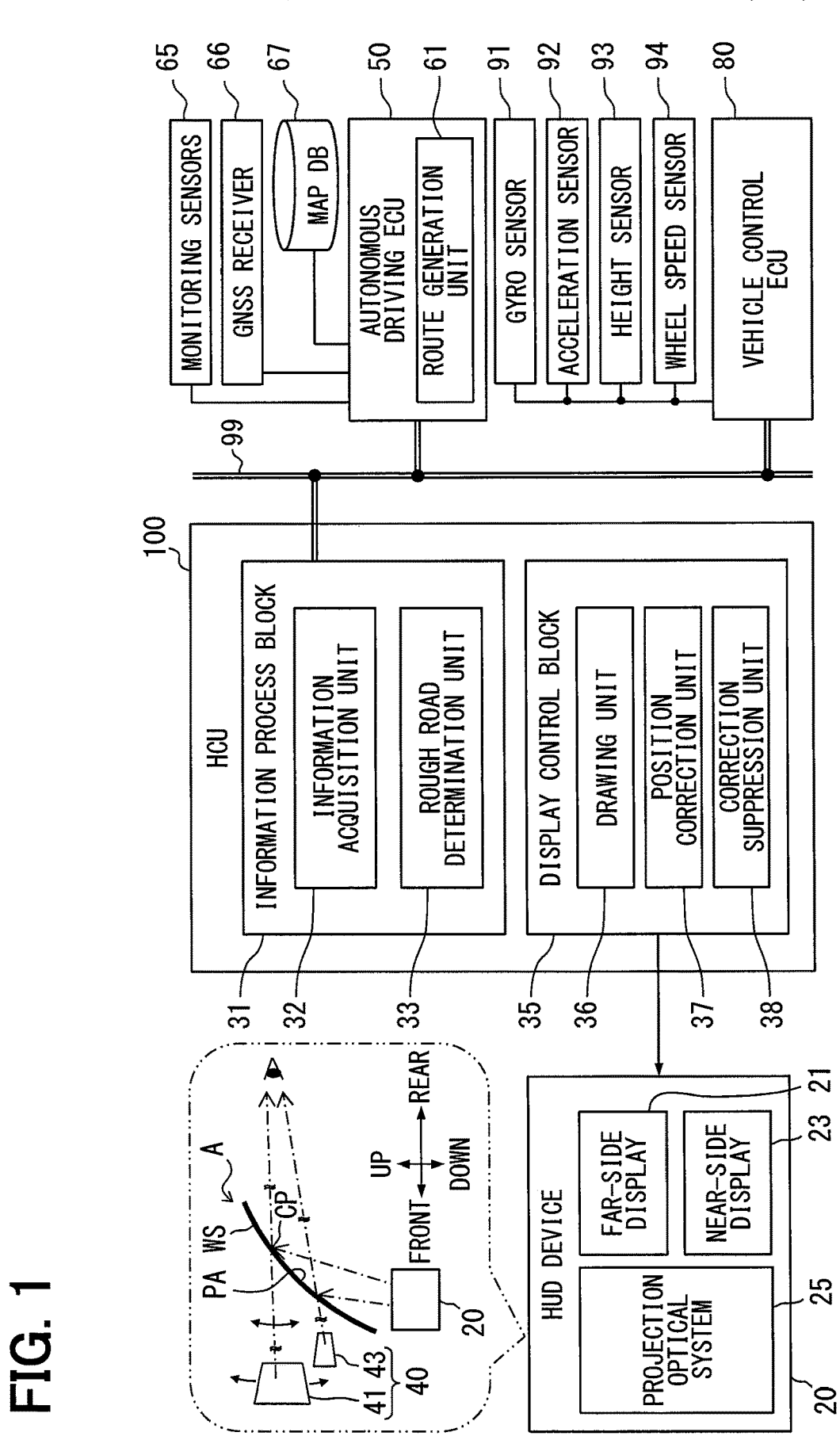
FIG. 1 is a block diagram showing a configuration related to virtual image display in an vehicular system.

In an example HUD device, when it is determined that the vehicle is travelling on a rough road, the display of the virtual image is interrupted. Therefore, presentation of the information for an occupant is not continued. If the display of the virtual image is continued even on a rough road, the displacement of the display position of the virtual image may not properly function due to the vibration with the high frequency generated in the vehicle, and the visibility of the virtual image may deteriorate.

According to a present disclosure, a display control device and a display control method is provided for continuing to provide information to a passenger while ensuring the visibility of a virtual image even when a vehicle travels on a rough road.

According to an example aspect, a display control device for controlling a display position of a virtual image displayed and superimposed on a foreground seen from an occupant in a vehicle, the display control device includes: an information acquisition unit for acquiring state information indicating a state of the vehicle and extracting attitude change information indicating an attitude change of the vehicle and vibration information indicating a vibration occurring in the vehicle from the state information; a position correction unit for correcting a displacement of the display position of the virtual image with respect to the foreground caused by the attitude change of the vehicle, based on the attitude change information; a rough road determination unit for determining whether a road is a rough road, the road on which the vehicle is traveling or scheduled to travel, based on the vibration information; and a correction suppression unit for suppressing a correction control of the display position executed by the position correction unit and continuing to display the virtual image, based on a rough road determination executed by the rough road determination unit.

In the above display control apparatus, when it is determined that the road is a rough road, the correction control for correcting the shift of the display position with respect to the foreground is suppressed. Therefore, even when a high-frequency vibration occurs in the vehicle traveling on a rough road, the virtual image continues to be displayed without following the vibration and moving the display position at a high speed. Therefore, even in a vehicle traveling on a rough road, information provision for passengers is continued while ensuring the visibility of the virtual image.

According to another example aspect, a display control method for controlling a display position of a virtual image displayed and superimposed on a foreground seen from an occupant in a vehicle, the display control method, using at least one processor, includes: acquiring state information indicating a state of the vehicle and extracting attitude change information indicating an attitude change of the vehicle and vibration information indicating vibration occurring in the vehicle from the state information; acquiring state information indicating a state of the vehicle and extract attitude change information indicating an attitude change of the vehicle and vibration information indicating vibration occurring in the vehicle from the state information; correcting a displacement of the display position of the virtual image with respect to the foreground caused by the attitude change of the vehicle, based on the attitude change information; and suppressing a correction control of the display position of the virtual image and continue to display the virtual image, based on a rough road determination.

In the above display control apparatus, when it is determined that the road is a rough road, the correction control for correcting the shift of the display position with respect to the foreground is suppressed. Therefore, even when a high-frequency vibration occurs in the vehicle traveling on a rough road, the virtual image continues to be displayed without following the vibration and moving the display position at a high speed. Therefore, even in a vehicle traveling on a rough road, information provision for passengers is continued while ensuring the visibility of the virtual image.

Hereinafter, multiple embodiments of the present disclosure will be described with reference to the drawings. The same reference numerals are assigned to the corresponding elements in each embodiment, and thus, duplicate descriptions may be omitted. When a part of the features in each embodiment is explained, the remaining part of the features may be provided by the features in other prior explained embodiments. Further, not only the combinations of the configurations explicitly shown in the description of the respective embodiments, but also the configurations of the plurality of embodiments can be partially combined even when they are not explicitly shown as long as there is no difficulty in the combination in particular. It should be understood that the unexplained combinations of the structural components recited in the following embodiments and modifications thereof are assumed to be disclosed in this description by the following explanation.

First Embodiment

Figure 2:
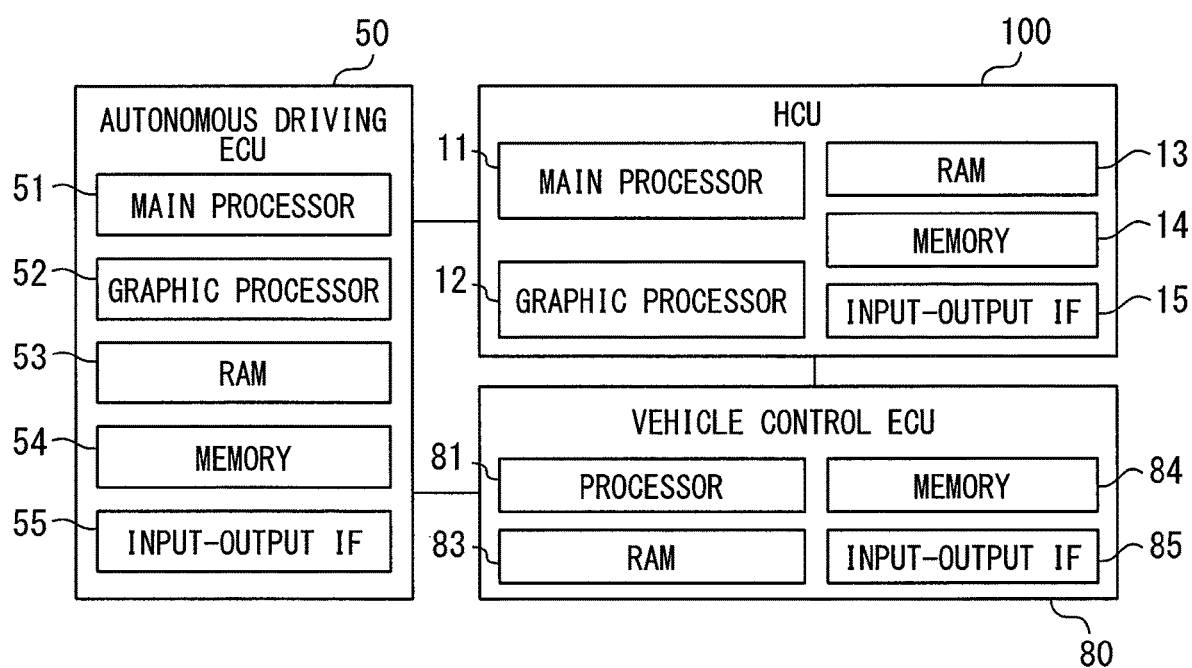
FIG. 2 is a diagram showing an example of a specific configuration of an HCU, an autonomous driving ECU, and a vehicle control ECU.

The function of the display control device according to the first embodiment of the present disclosure is realized by the HCU (Human Machine Interface) control unit 100 shown in FIGS. 1 and 2. The HCU 100 is mounted on the vehicle A together with electronic control units such as an electronic control unit (ECU) 80 and an autonomous driving ECU 50. The HCU 100, the vehicle control ECU 80, and the autonomous driving ECU 50 are directly or indirectly electrically connected to each other, and can communicate with each other via, for example, a communication bus 99 of the vehicular network.

The vehicle control ECU 80 mainly includes a computer having a processor 81, a RAM 83, a memory 84, an input/output interface 85, and the like. The vehicle control ECU 80 integrally controls acceleration/deceleration, steering, etc. of the vehicle A by executing the vehicle control program stored in the memory 84 using the processor 81. The vehicle control ECU 80 is directly or indirectly electrically connected to the vehicular sensor group and the vehicular actuator group mounted on the vehicle A.

The vehicular sensor group includes, for example, a gyro sensor 91, an acceleration sensor 92, a height sensor 93, and a wheel speed sensor 94. The gyro sensor 91 is a sensor that detects the angular velocity as a voltage value. The gyro sensor 91 measures the angular velocity generated around each axis with respect to mutually orthogonal three axes fixed to the vehicle A and preliminarily defined for the vehicle A. Specifically, the gyro sensor 91 measures the angular velocity in association with the yawing, the pitching, and the rolling of the vehicle A, and sequentially outputs measurement data to the vehicle control ECU 80.

The acceleration sensor 92 is a sensor that detects the acceleration as a voltage value. The acceleration sensor 92 is fixed to the vehicle A and measures the acceleration in the direction along each of the three axes preliminarily defined for the vehicle A. Specifically, the acceleration sensor 92 measures the acceleration in the front-back direction, the acceleration in the left-right direction, and the acceleration in the vertical direction of the vehicle A, and sequentially outputs the measurement data to the vehicle control ECU 80.

The height sensor 93 is a sensor for detecting the vehicle height of the vehicle A. The height sensor 93 is arranged, for example, in the vicinity of each wheel of the vehicle A, and measures the amount of sinking relative to the vehicle body for each wheel which is vertically displaced by the operation of the suspension device. The height sensor 93 sequentially outputs measured data obtained by measuring the sinking amount of each wheel to the vehicle control ECU 80. It should be noted that the height sensor 93 may be configured to directly measure the distance from the vehicle body to the road surface with ultrasonic wave or laser light radiated from the vehicle body toward the road surface.

The wheel speed sensor 94 is a sensor for detecting the rotation of the wheel of the vehicle A. The wheel speed sensor 94 is arranged in the vicinity of each wheel of the vehicle A and measures the rotation speed of the wheel according to the difference in the rotation speed of the rotor rotating together with the wheel and the detection unit fixed to the vehicle body. The wheel speed sensor 94 sequentially outputs the measurement data obtained by measuring the rotation speed of each wheel to the vehicle control ECU 80.

The vehicular actuator group includes, for example, an electronic control throttle, an injector, a brake actuator, a motor generator for driving and regeneration, a steering actuator, and the like. The vehicle control ECU 80 controls the behavior of the vehicle A by controlling each vehicular actuator in accordance with an instruction of at least one of the driver and the autonomous driving ECU 50.

The autonomous driving ECU 50 performs acceleration/deceleration control and steering control of the vehicle A in cooperation with the vehicle control ECU 80. Thus, due to the mounting of the autonomous driving ECU 50 and the autonomous driving ECU 50, the vehicle A has an autonomous driving function. The autonomous driving function can perform the driving operation of the vehicle A on behalf of the driver. The autonomous driving function covers an autonomous driving function that does not require monitoring by the driver. In addition, advanced driving support functions such as ACC (Adaptive Cruise Control) and LTC (Lane Trace Control) are also included in the autonomous driving function.

The autonomous driving ECU 50 mainly includes a computer having a main processor 51, a graphic processor 52, a RAM 53, a memory 54, and an input/output interface 55. The autonomous driving ECU 50 is directly or indirectly electrically connected to the peripheral monitoring sensor group 65, the GNSS receiver 66, the map DB 67, and the like.

The peripheral monitoring sensor group 65 includes, for example, a camera unit, a lidar, a millimeter wave radar, and the like. The peripheral monitoring sensor group 65 detects moving objects such as pedestrians and other vehicles around the vehicle A, and stationary objects such as fallen objects on the road, traffic signals, guardrails, curbstones, road signs, road markings, and lane markers. Each configuration of the peripheral monitoring sensor group 65 sequentially outputs detection information of the moving objects and the stationary objects to the autonomous driving ECU 50. In addition, the peripheral monitoring sensor group 65 may also detect information relating to the bumpy road surface in the traveling direction such as a highway joint, and output the result to the autonomous driving ECU 50.

A GNSS (Global Navigation Satellite System) receiver 66 receives positioning signals from a plurality of artificial satellites. The GNSS receiver 66 measures the current position of the vehicle A based on the received positioning signal. The GNSS receiver 66 sequentially outputs the measured position information of the vehicle A to the autonomous driving ECU 50.

The map DB 67 mainly includes a large-capacity storage medium storing a large number of map data. The map data includes structural information such as the curvature value of each road, the gradient value, and the length of each section, and non-temporary traffic regulation information such as speed limit and one-way traffic. In addition, the map data may be associated with information relating to the bumpy road surface collected by the subject vehicle and other autonomous driving vehicles or the like. The autonomous driving ECU 50 acquires map data of the surroundings and the traveling direction of the vehicle A from the map DB 67 based on the position information measured by the GNSS receiver 66.

The autonomous driving ECU 50 can execute the autonomous driving program stored in the memory 54 using the processors 51 and 52. The autonomous driving ECU 50 provides the route generation unit 61 as a functional block relating to the autonomous driving based on the autonomous driving program. The route generation unit 61 generates a route plan for autonomously driving the vehicle A based on the travelling environment surrounding the vehicle A recognized by the peripheral monitoring sensor group 65 and the map data provided from the map DB 67. The autonomous driving ECU 50 controls the vehicle control ECU 80 to execute the steering for tracing a traffic lane and changing a traffic lane, acceleration/deceleration for adjusting a speed, sudden braking for avoiding collision, etc., based on the route plan generated by the route generation unit 61.

The HCU 100 integrally controls information presentation to the driver. The HCU 100 mainly includes a computer having a main processor 11, a graphic processor 12, a RAM 13, a memory 14, and an input/output interface 15. The HCU 100 is electrically connected to a plurality of notification devices for notifying the driver of the information. The plurality of notification devices include the HUD device 20.

Figure 3:
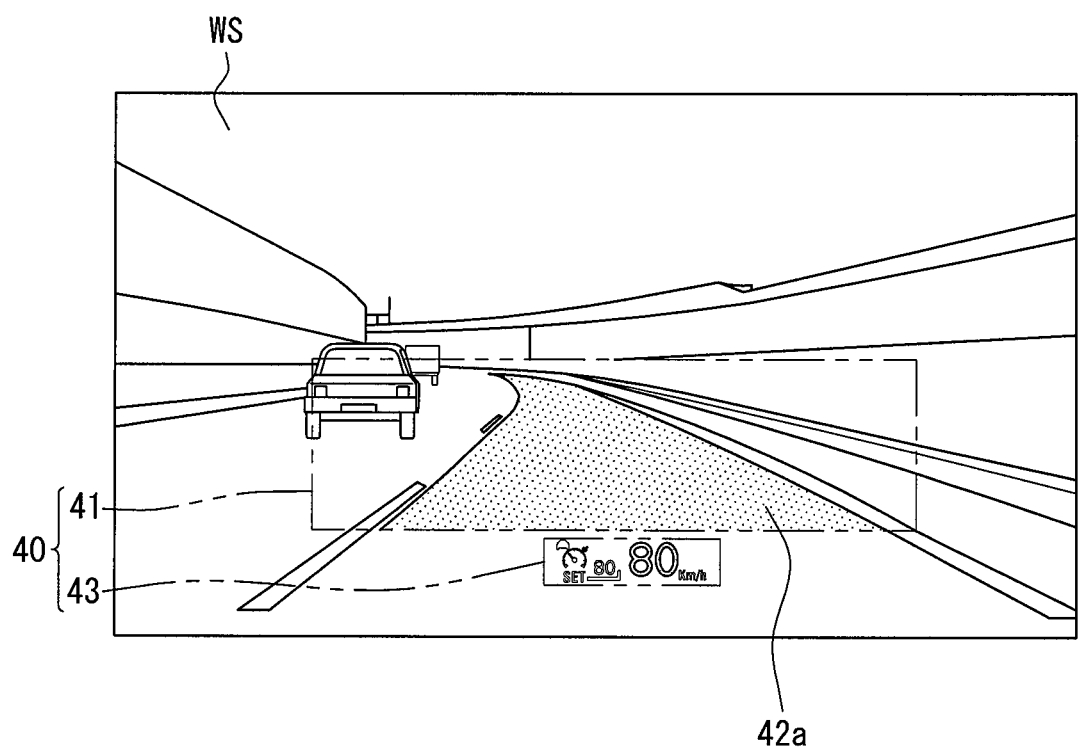
FIG. 3 is a diagram showing an example of content displayed as a virtual image, and showing a virtual image display during autonomous driving.

The HUD device 20 is a display that displays a virtual image 40 in front of a passenger of the vehicle A, for example, a driver. The HUD device 20 projects light of a plurality of (e.g., two) display images onto the projection area PA of the windshield WS. The light projected on the windshield WS is reflected toward the driver on the projection area PA, and reaches a predetermined eye box so as to be located around the driver's head. A driver who positions the eye point in the eye box can see the light of the display image as a virtual image 40 superimposed on the foreground scenery. As shown in FIGS. 1 and 3, the virtual image 40 is displayed so as to be superimposed on the foreground scenery viewed from the driver. The virtual image 40 includes a near virtual image 43 and a far virtual image 41.

The near virtual image 43 and the far virtual image 41 are imaged at different positions in the front and rear direction and the vertical direction of the vehicle A. The near virtual image 43 is formed in the space of about 2 to 3 meters in front of the vehicle A from the eye point, and is displayed, for example, about 2 meters ahead of the eye point. The near virtual image 43 mainly presents the vehicle information indicating the state of the vehicle A to the driver. For example, the traveling speed of the vehicle A, an indicator indicating the activation state and the operation state of the autonomous driving function, and the like are displayed as the near virtual image 43.

The far virtual image 41 is formed at a position farther from the windshield WS than the near virtual image 43, more specifically, in the space of about 10 to 20 meters in front of the vehicle A from the eye point. As one example, the far virtual image 41 is displayed about 15 meters ahead of the eye point. The far virtual image 41 functions as an augmented reality (hereinafter referred to as "Augmented Reality: AR") display by being superimposed on the road surface or the like apparently by the driver. When the autonomous driving function of the vehicle A is in an operating state, the far virtual image 41 presents the vehicle information relating to the autonomous driving to the driver. On the other hand, when the vehicle A is in the manual driving state, the far virtual image 41 presents warning information to the driver.

Figure 6:
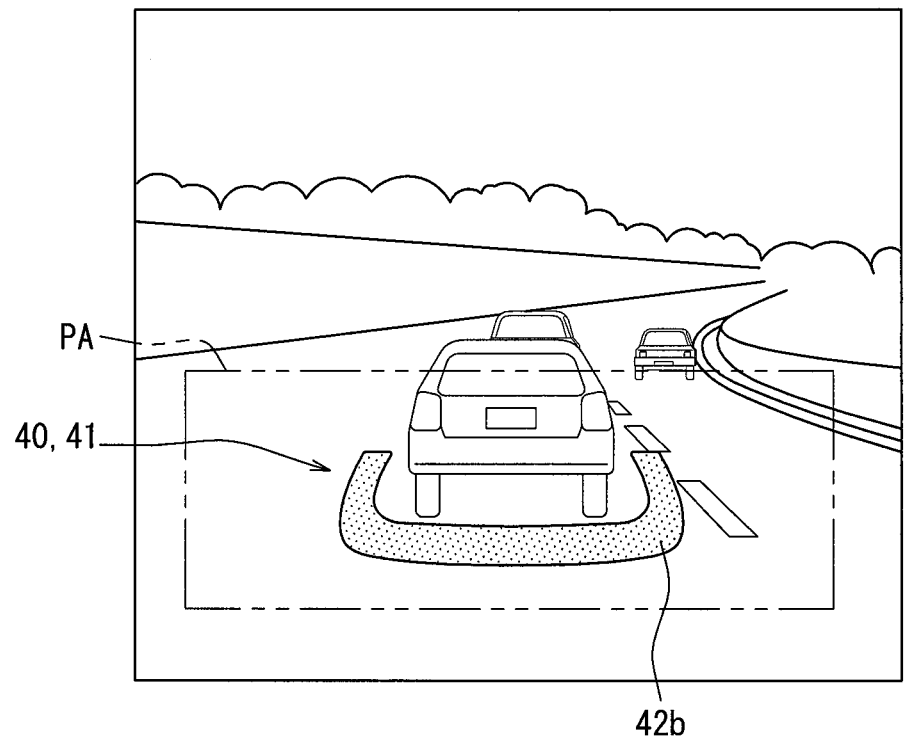
FIG. 6 is a diagram showing a virtual image in a case where the vehicle follows a preceding vehicle by the ACC function.
Figure 6:
Figure 6:
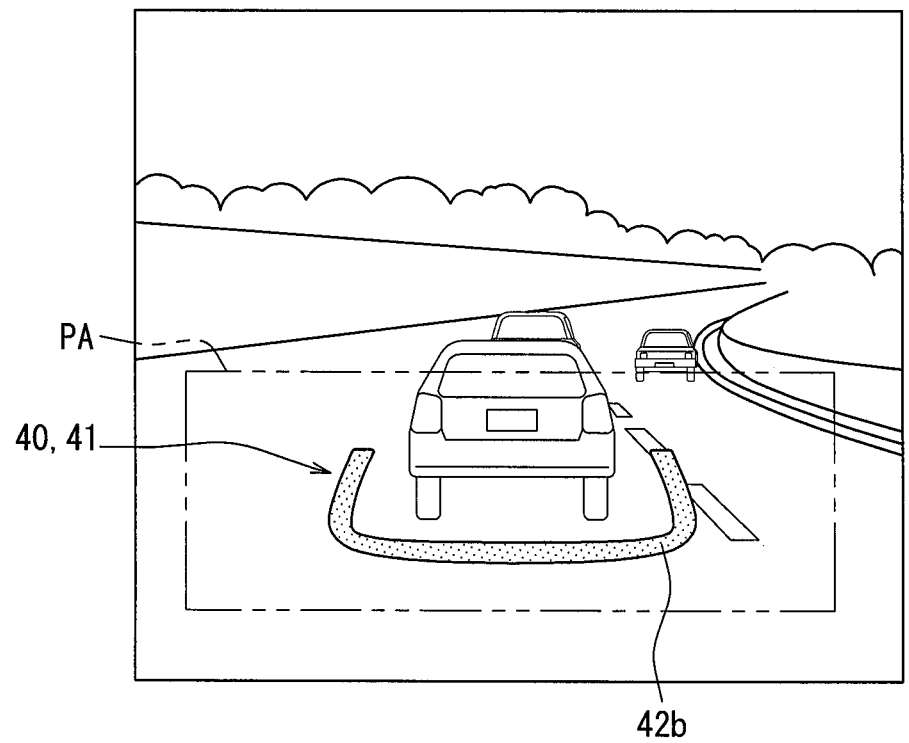

Specifically, when the autonomous driving function is in the operating state, the HUD device 20 displays the AR route 42a as the far virtual image 41 (see FIG. 3). The AR route 42a is a superimposed display for pseudo-shining the road surface on which the vehicle A is to be traveling, based on the route plan generated by the route generation unit 61. Further, when the ACC function functions to control the vehicle A to follow the preceding vehicle, the HUD device 20 displays the ACC target 42b as a far virtual image 41. The ACC target 42b is a marking indicating that it is a follow-up target, and is superimposed and displayed under the preceding vehicle in the foreground scenery (see FIG. 6). In addition, the HUD device 20 displays the warning marker as the far virtual image 41 when the autonomous driving function is in a stopped state. The warning marker is superimposed and displayed on the object to be notified such as a pedestrian approaching the vehicle A, and alerts the driver to the presence of the notification object.

As a configuration for displaying the near virtual image 43 and the far virtual image 41, the HUD device 20 includes a far display 21, a near display 23, and a projection optical system 25. The far display 21 emits light of a display image formed as a far virtual image 41 at a position farther from the vehicle A than the near virtual image 43, toward the projection optical system 25. The near display unit 23 emits the light of the display image formed as the near virtual image 43 toward the projection optical system 25. The far display 21 and the near display device 23 each have a display surface or a screen for light-emitting display images. The image data of the display image displayed by the far display 21 and the near display 23 are generated by the HCU 100, and input to the far display 21 and the near display 23.

The projection optical system 25 includes a reflecting mirror, which is formed by depositing a metal such as aluminum, on the surface of a colorless and transparent substrate made of synthetic resin, glass, or the like. The projection optical system 25 reflects the light of each display image emitted from the far display 21 and the near display unit 23 toward the projection area PA by the reflecting mirror. The light of each display image is projected onto the projection area PA by the projection optical system 25.

The HCU 100 executes the display control program stored in the memory device 14 by each of the processors 11 and 12 in order to control the display positions and display modes of the far virtual image 41 and the near virtual image 43 to be displayed by the HUD device 20. In the HCU 100, the information processing block 31 and the display control block 35 are constructed as functional blocks according to the display control program.

The information processing block 31 selectively acquires information necessary for display control among various vehicle information and various state information of the vehicle A output to the communication bus 99 from the autonomous driving ECU 50 and the vehicle control ECU 80. In addition, the information processing block 31 performs a process of converting the acquired information into a state suitable for display control. The information processing block 31 includes an information acquisition unit 32 and a rough road determination unit 33 as sub-function blocks.

The information acquisition unit 32 acquires measurement data of angular velocity by the gyro sensor 91 and measurement data of acceleration by the acceleration sensor 92 as the state information indicating the state of the vehicle A. In addition, the information acquisition unit 32 also acquires the measurement data of the vehicle height by the height sensor 93, the measurement data of the wheel speed by the wheel speed sensor 94, and the like as the state information. Further, the information acquisition unit 32 acquires the information of the gradient value associated with the map data, the irregularity information of the road surface, etc. as the state information. The information acquisition unit 32 extracts attitude change information indicating the attitude change occurring in the vehicle A and vibration information indicating the vibration occurring in the vehicle A from the obtained state information. The attitude change information and the vibration information may be current information or future estimation information.

The attitude change information is generated, for example, based on the measurement data of the angular velocity in the pitch direction and the measurement data of the acceleration in the up and down direction. More specifically, the crossing position CP where the imaginary line defined between the eye point of the driver and the superimposed object of the far virtual image 41 (for example, the road surface and the preceding vehicle and the like) crosses the projection area PA is displaced by the attitude change of the vehicle A. The attitude change information is information obtained by three-dimensionally calculating the moving direction and the moving amount of the crossing position CP due to the attitude change. Here, the attitude change information may be calculated based on the gradient value of the road surface stored in the map data. Alternatively, the attitude change information based on the measurement data may be corrected based on the gradient value.

Figure 4:
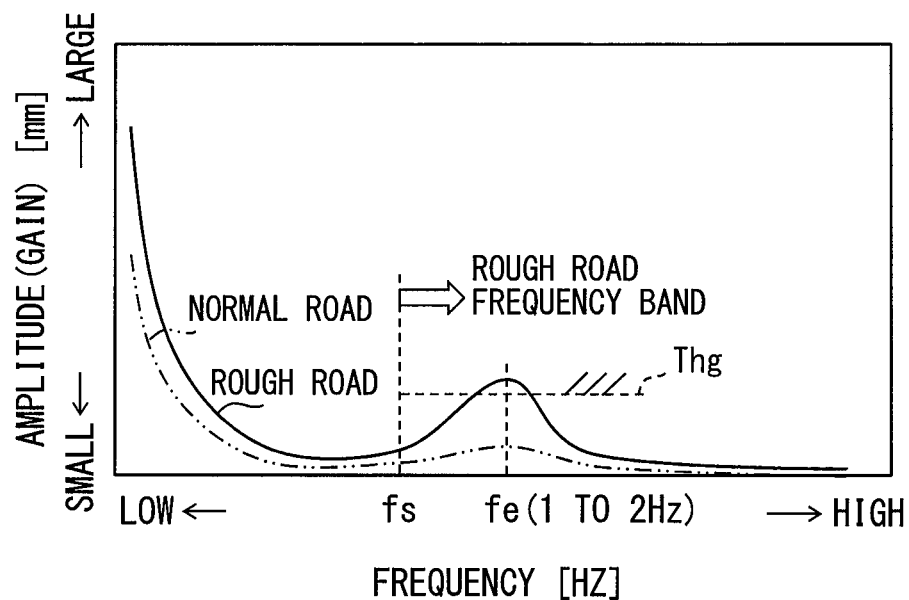
FIG. 4 is a diagram showing the input information from the road surface as a correlation between a frequency and an amplitude, and explaining the detail of rough road determination of the first embodiment.

The vibration information is generated, for example, based on the measurement data of the acceleration in the vertical direction. More specifically, the vibration generated in the vehicle A by the input from the road surface has a relationship between the frequency and the amplitude (i.e., the gain) as shown in FIG. 4. The amplitude of the vibration occurring in the vehicle A is remarkably increased particularly around the natural frequency fe and frequencies in the vicinity thereof due to the travelling on the rough road. The information acquisition unit 32 removes the information of the low frequency band from the information of the entire frequency band included in the measurement data, and extracts the information of the rough road frequency band in which the amplitude is particularly increased due to the travelling on a rough road as vibration information.

Here, the natural frequency fe is an eigen value determined in accordance with the weight of each of the sprung mass and the unspring mass of the vehicle A, the spring constant of the spring arranged in the suspension device of each wheel, and the like. The natural frequency fe is, for example, about 1 Hz to 2 Hz. Therefore, in the first embodiment, a band equal to or higher than a specific frequency fs (for example, 1 Hz), which is lower than the natural frequency fe, is set to be a rough road frequency band. Further, the information acquisition unit 32 may acquire the irregularity information of the road surface recorded in the map data as vibration information.

Figure 5:
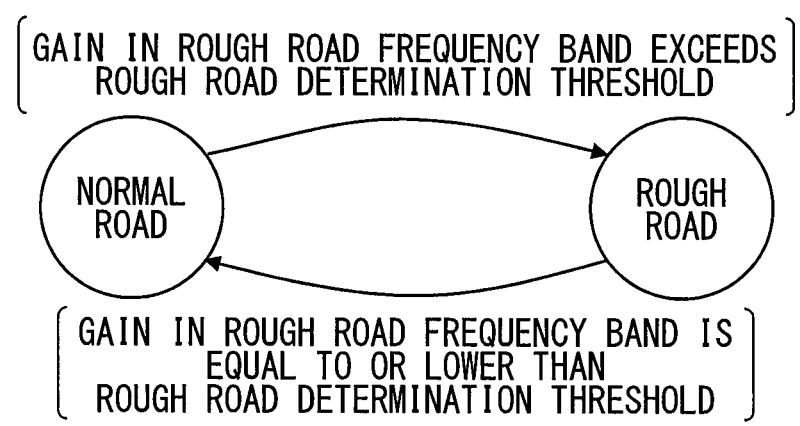
FIG. 5 is a diagram showing a state transition diagram of a detail of a transition of a vehicle state relating to a setting of a rough road flag.

Based on the vibration information extracted by the information acquisition unit 32, the rough road determination unit 33 determines whether the road A on which the vehicle A is traveling or scheduled to travel is a rough road. The rough road determination unit 33 compares the gain of the rough road frequency band, more specifically, the maximum amplitude generated in the vicinity of the natural frequency fe with the preset rough road determination threshold Thg (see FIG. 4). By such a comparison, the rough road determination unit 33 switches the vehicle state between the state of traveling on the normal road and the state of traveling on a rough road (see FIG. 5). When the gain of the rough road frequency band exceeds the rough road determination threshold Thg (see the solid line in FIG. 4), the rough road determination unit 33 determines the rough road, and sets the rough road flag to be the on state. On the other hand, when the gain of the rough road frequency band is equal to or less than the rough road determination threshold Thg (see the two-dot chain line in FIG. 4), the rough road determination unit 33 determines the normal road, and sets the rough road flag to be the off state.

Here, the rough road determination unit 33 may switch the vehicle state related to the road surface using two rough road determination threshold values Thg having different values. More specifically, the on-state threshold for switching the rough road flag from the off state to the on state may be set to a value higher than the off-state threshold for switching the rough road flag from the on state to the off state. According to such setting thresholds, the hunting of a rough road flag can be suppressed.

The display control block 35 controls the display of the HUD device 20 based on the information processed in the information processing block 31. The display control block 35 includes a drawing unit 36, a position correction unit 37, and a correction suppression unit 38 as sub-function blocks.

The drawing unit 36 generates the image data of the display image formed as the far virtual image 41 and the near virtual image 43, based on the various vehicle information acquired by the information acquisition unit 32. The drawing unit 36 sequentially outputs the drawn image data to the far display 21 and the near display 23, respectively. The drawing unit 36 changes the mode of the images such as the type and the arrangement of images displayed as the far virtual image 41 and the near virtual image 43, based on the vehicle information and the state information.

When the rough road determination unit 33 determines the rough road, the drawing unit 36 changes the display mode of the far virtual image 41 to be an ambiguous display mode rather than the normal display mode in a case where the rough road determination is not performed. As an example, when the HUD device 20 is displaying an AR route 42a (see FIG. 3) indicating a route plan, the drawing unit 36 reduces the entire luminance of the AR route 42a to be lower than the luminance in a case where the vehicle travels on a normal road, based on the rough road determination. As described above, since the AR route 42a is in an inconspicuous ambiguous display mode, the driver can not perceive the positional deviation caused by the change in the vehicle attitude due to the vibration.

Similarly, when the HUD device 20 is displaying the ACC target 42b (see FIG. 6) indicating the target vehicle to be followed, the width of the ACC target 42b displayed in a belt shape is narrowed based on the rough road determination. As described above, the ACC target 42b whose emission area is narrowed has a display mode that is darker than in the normal state. In addition, due to the decrease in the width, a clearance for allowing positional deviation is secured between the actual follow-up vehicle and the ACC target 42b, in view of the visual appearance of the driver. As described above, since the ACC target 42b is displayed in an ambiguous display mode, the positional deviation caused by the change in the vehicle attitude is hardly perceived by the driver.

The position correction unit 37 corrects the shift of the display position of the virtual image 40 with respect to the foreground caused by the change in the attitude of the vehicle A based on the attitude change information. The position correction unit 37 performs control for correcting the shift of the display position only for the far virtual image 41 among the far virtual image 41 and the near virtual image 43 based on the attitude change information. That is, the position correction unit 37 does not correct the display position of the near virtual image 43 used for the attitude change information.

For example, the vehicle A in the ascending slope state is in an attitude in which the front side is raised rather than traveling on a flat road. In this case, when the far virtual image 41 is properly superimposed on the object to be superimposed, the display position of the far virtual image 41 needs to be set at a position lower than usual. Similarly, the vehicle A in the descending slope state is in an attitude in which the front side is lower than travelling on a flat road. In this case, when the far virtual image 41 is properly superimposed on the object to be superimposed, the display position of the far virtual image 41 needs to be set at a position higher than usual.

Based on the attitude change information, the position correction unit 37 adjusts the display position of the far virtual image 41 at least in the vertical direction so that the far virtual image 41 is properly superimposed on the object to be superimposed. Specifically, the position correction unit 37 displaces the drawing position of the far display image formed as the far virtual image 41 on the display surface of the far display 21 or the screen based on the attitude change information. According to the displacement of the drawing position of the far display image, since the projection position of the light of the far display image in the projection area PA changes, the display position of the far virtual image 41 also moves. The position correction unit 37 maintains a state in which the far virtual image 41 is properly superimposed on the object to be superimposed by displacing the drawing position of the far display image so that the attitude change of the vehicle A is compensated.

The correction suppression unit 38 suppresses the correction control of the display position of the far virtual image 41 by the position correction unit 37 based on the rough road determination by the rough road determination unit 33. The correction suppression unit 38 of the first embodiment substantially stops the correction control by the position correction unit 37. In the case where the correction control of the display position is terminated by the correction suppression unit 38, the position correction unit 37 displaces the far virtual image 41 to the specific display position and continues the display at the specific display position. According to the continuous display of the far virtual image 41, even when the vehicle A is traveling on a rough road, the vehicle information related to the autonomous driving and the warning information to the driver are continuously presented through the far virtual image 41. Here, the specific display position is the display position of the far virtual image 41 in the case where it is assumed that the vehicle A is placed on a horizontal road surface, for example. Alternatively, the specific display position may be the lowermost display position in the range in which the far virtual image 41 can be displayed.

Figure 7:
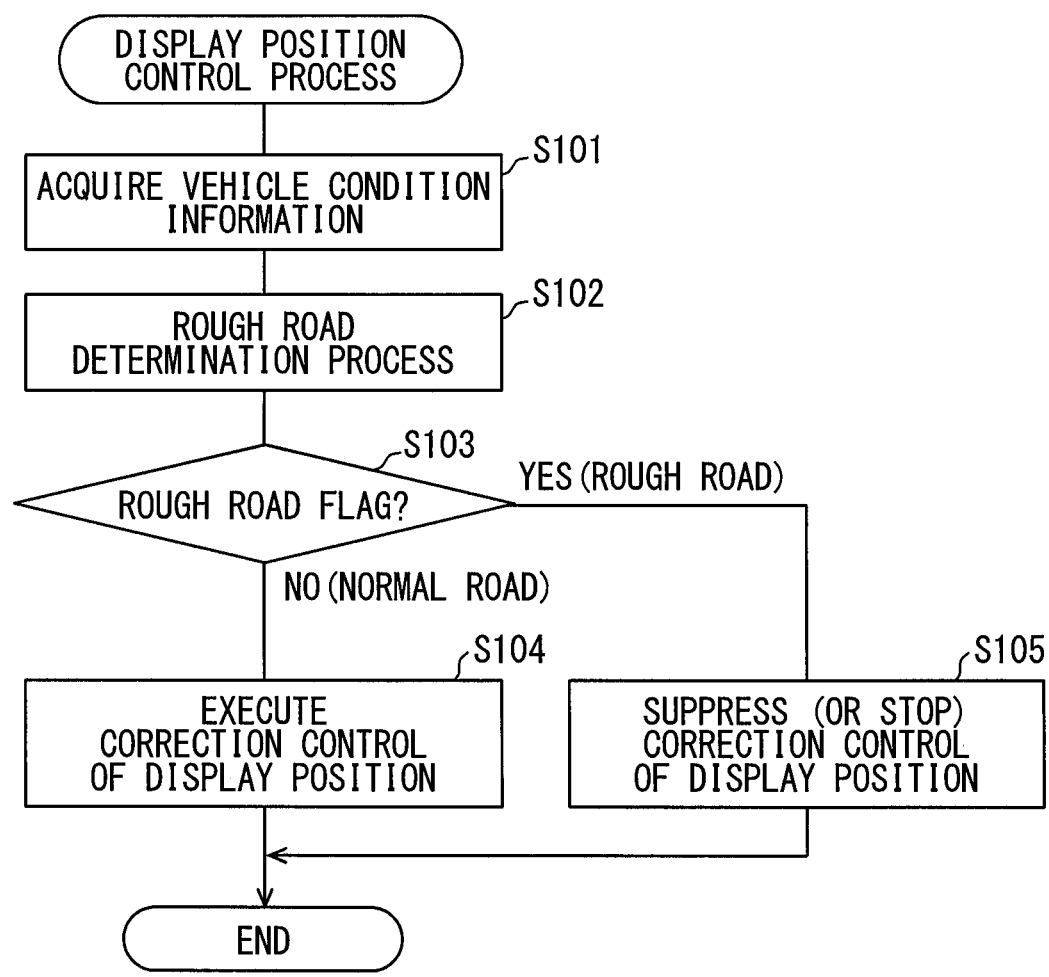
FIG. 7 is a flowchart showing a detail of a display position control process according to the first embodiment.

Details of the display position control process for controlling the display position of the far virtual image 41 by the HCU 100 described above will be described with reference to FIG. 1 based on FIG. 7. The HCU 100 starts executing the display position control process in association with the start of the virtual image display by the HUD device 20. The HCU 100 repeatedly executes the display position control process until the display of the HUD device 20 is ended.

In S101, the information acquisition unit 32 acquires the state information of the vehicle A, and the process proceeds to S102. In S101, the attitude change information and the vibration information are extracted based on the state information. In S102, the rough road determination process is executed based on the vibration information extracted in S101, and the process proceeds to S103. In S103, the presence or absence of a rough road flag is determined with reference to the result of the rough road determination process in S102.

When it is determined in S103 that the rough road flag is not set, it is presumed that the vehicle A is traveling on the normal road, and the process proceeds to S104. In S104, the position correction unit 37 executes the correction control of the display position of the far virtual image 41, and the display control process is temporarily ended. On the other hand, when it is determined in S103 that the rough road flag is set, it is presumed that the vehicle A is traveling on a rough road, and the process proceeds to S105. In S105, the correction control by the position correction unit 37 is stopped, and the display control process is temporarily ended.

Figure 8:
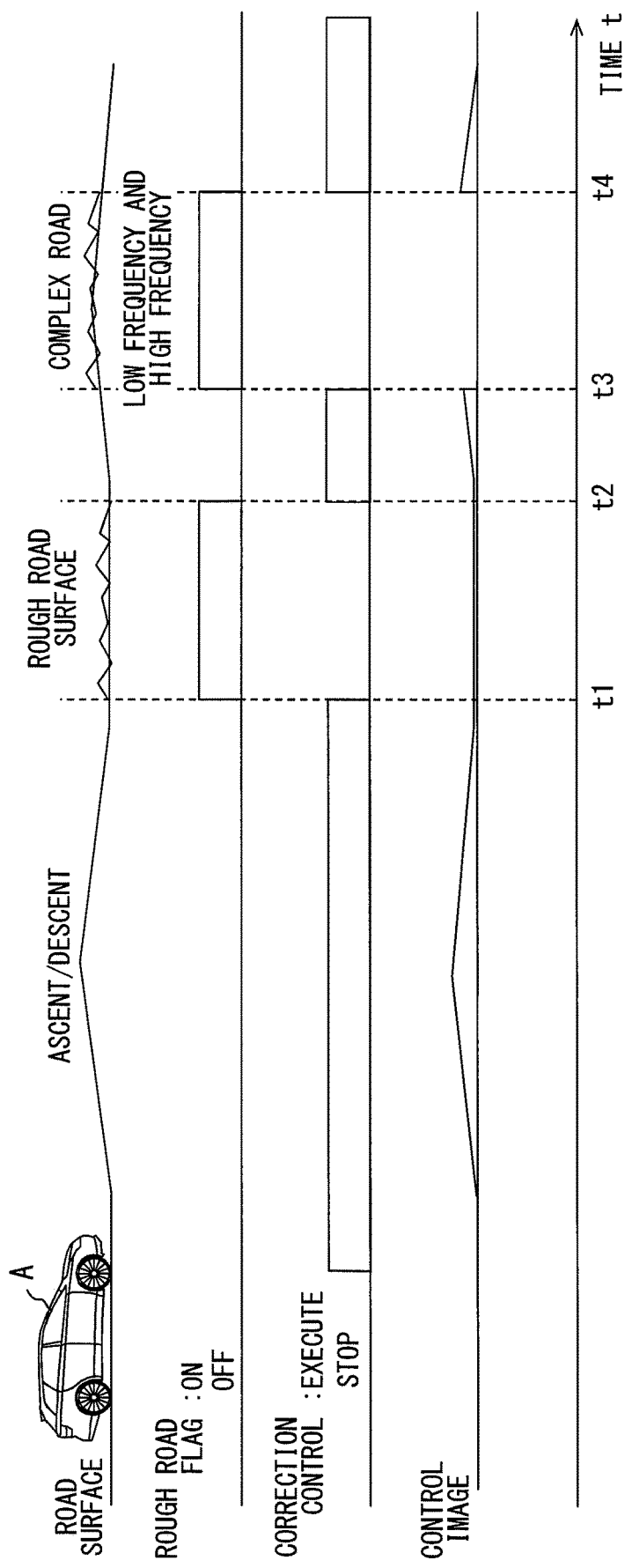
FIG. 8 is a time chart showing a transition of a control state according to a change of a road surface.

The transition of the display control state based on the above display control process will be described with reference to FIG. 1 based on the time chart shown in FIG. 8.

Before time t1, the vehicle A is traveling on a road in a normal paved state. Therefore, the rough road flag is not set and it is in the off state. In this control state, the correction control by the position correction unit 37 is effectively performed. Therefore, when the vehicle A travels on a road with a slope, the display position of the far virtual image 41 moves up and down in accordance with the change in the attitude of the vehicle A due to the uphill slope and the downhill slope. As described above, the far virtual image 41 is continuously superimposed on the object to be superimposed in the foreground with high accuracy.

At time t1, the vehicle A enters the road area with a rough road surface. When the vehicle A enters a rough road area, the rough road determination unit 33 sets a rough road flag. Due to the setting of the rough road flag, the correction suppression unit 38 stops executing the correction control by the position correction unit 37. As a result, the far virtual image 41 is moved to the specific display position, and the display at the specific display position is continued.

At time t2, the vehicle A get away from the road area with a rough road surface. When the vehicle A enters again into the road area where the road is in a normal paved state, the rough road flag is canceled. By canceling the rough road flag, the correction control by the position correction unit 37 becomes effective. As a result, the position correction unit 37 corrects the display position of the far virtual image 41 according to the change in the attitude of the vehicle A caused by the gradient of the road.

At time t3, the vehicle A enters a road area having a slope and a rough road surface (hereinafter referred to as "complex road"). Due to the traveling on the complex road, the vehicle A generates an attitude change due to the rugged landscape and a high frequency vibration due to the irregularity of the road surface. According to the entrance to the complex road, the rough road flag is set by the rough road determination unit 33, and the correction suppression unit 38 stops the correction control by the position correction unit 37. As a result, the far virtual image 41 is changed to an ambiguous display mode and continues to be displayed at the specific display position.

When the vehicle A passes through the complex road and enters the normal gradient road at time t4, the rough road determination unit 33 cancels the rough road flag. As described above, the correction control by the position correction unit 37 is effective again. As a result, the position correction unit 37 restores the display mode of the far virtual image 41 to be normal, and restarts the correction control of the display position of the far virtual image 41.

Here, using the irregularity information of the road surface as the vibration information, when it is predicted that the vehicle will enter a rough road, the rough road flag may be switched to the on state at a timing slightly faster than the time points t1 and t3. Further, when it is clear based on the map data that the rough road ends at a short distance, suppression of the correction control according to the setting of the rough road flag may not be implemented.

In the first embodiment explained above, when it is determined that the road, on which the vehicle A is traveling or is scheduled to travel, is a rough road, the correction control for correcting the shift of the display position of the virtual image 40 with respect to the foreground is suppressed. Therefore, even when a high-frequency vibration occurs in the vehicle A traveling on a rough road, the virtual image 40 continues to be displayed without following the vibration and moving the display position at a high speed. Therefore, even in the vehicle A traveling on a rough road, it is possible to continue to provide information directed to the occupant such as the driver while ensuring the visibility of the virtual image 40.

In addition, in the first embodiment, when the correction control is suppressed, the display mode of the far virtual image 41 is changed to an ambiguous display mode rather than the normal display mode in the case where the rough road determination is not performed. In this manner, when the display mode of the far virtual image 41 becomes ambiguous, it is difficult for the occupant to recognize the displacement of the display position of the virtual image 40 caused by the vibration of the vehicle A. Therefore, deterioration of the visibility of the far virtual image 41 caused by the rough road travelling is further suppressed.

In the first embodiment, the rough road determination is performed based on the vibration information of the rough road frequency band. Generally, the frequency of the vibration generated along with travelling on a rough road is in a higher band than the frequency such as a pitching action due to acceleration and deceleration and a rolling action due to a steering operation. Therefore, using the vibration information of the rough road frequency band from which the vibration caused by pitching and rolling is removed, the rough road determination unit 33 can determine with high accuracy whether the vehicle A is traveling on a rough road. Therefore, the suppression of the correction control is appropriately carried out when traveling on a rough road.

In the first embodiment, the correction control of the display position by the position correction unit 37 is stopped based on the rough road determination. In this way, when the correction control on the rough road is stopped, it is possible to avoid a situation where the visibility is deteriorated by the displacement of the display position where the vibration of the rough road can not be attenuated.

Furthermore, in the first embodiment, when the correction control is canceled, the far virtual image 41 is continuously displayed while being moved to the specific display position, not the display position at the time of determining the control cancellation. According to the control of such a display position, a situation where the display position of the far virtual image 41 is fixed at a position difficult to visually recognize from the passenger is avoided.

In addition, in the first embodiment, the correction control is performed only for the far virtual image 41 among the far virtual image 41 and the near virtual image 43. The near virtual image 43 mainly presents the vehicle information related to the vehicle A to the occupant. Therefore, it is desirable that the near virtual image 43 does not change its position with respect to the windshield WS of the vehicle A. On the other hand, the far virtual image 41 is combined with the object to be superimposed in the foreground to perform AR display. Therefore, when the correction control for attenuating the attitude change of the vehicle A is not performed, the information on the far virtual image 41 becomes difficult to correctly transmit to the occupant. Thus, in the configuration in which the near virtual image 43 and the far virtual image 41 are displayed, it is preferable that the correction control of the display position and the suppression control of the position correction are performed only for the far virtual image 41.

Both the attitude change information and vibration information according to the first embodiment can be acquired from measurement data of vehicular sensors such as the gyro sensor 91, the acceleration sensor 92, and the height sensor 93. Therefore, the HCU 100 can effectively use the limited measurement data and can perform both the correction control and the suppression control.

In addition, in the first embodiment, the vehicle information related to the autonomous driving is displayed through the far virtual image 41. When the display of the far virtual image 41 is interrupted in the vehicle A due to the rough road travelling during the autonomous driving, the passenger may be easy to feel the anxiety that the autonomous driving function is abnormal. Therefore, the display control of continuing the virtual image display even while traveling on a rough road is particularly suitable for the vehicle A that displays the vehicle information related to the autonomous driving as a virtual image.

In the first embodiment, the warning information during the manual driving is presented to the driver through the far virtual image 41. When the presentation of the warning information is interrupted due to the rough road travelling, the driver may misunderstand as if the warning object and trouble indicated by the far virtual image 41 are gone. Therefore, the configuration of continuously displaying the far virtual image 41 even on a rough road is particularly suitable for the vehicle A using the far virtual image 41 for presenting the warning information.

In the first embodiment, the drawing unit 36 corresponds to the "mode changing unit", the HCU 100 corresponds to the "display control device", the main processor 11 and the graphic processor 12 correspond to the "processing unit", the height sensor 93 corresponds to "vehicle height sensor".

Second Embodiment

Figure 9:
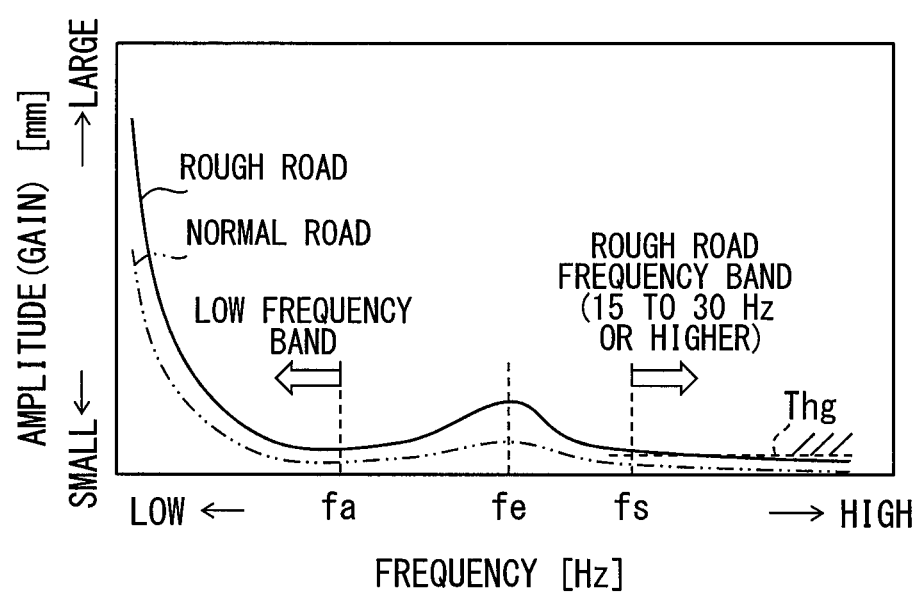
FIG. 9 is a diagram explaining a detail of a rough road determination according to the second embodiment.
Figure 10:
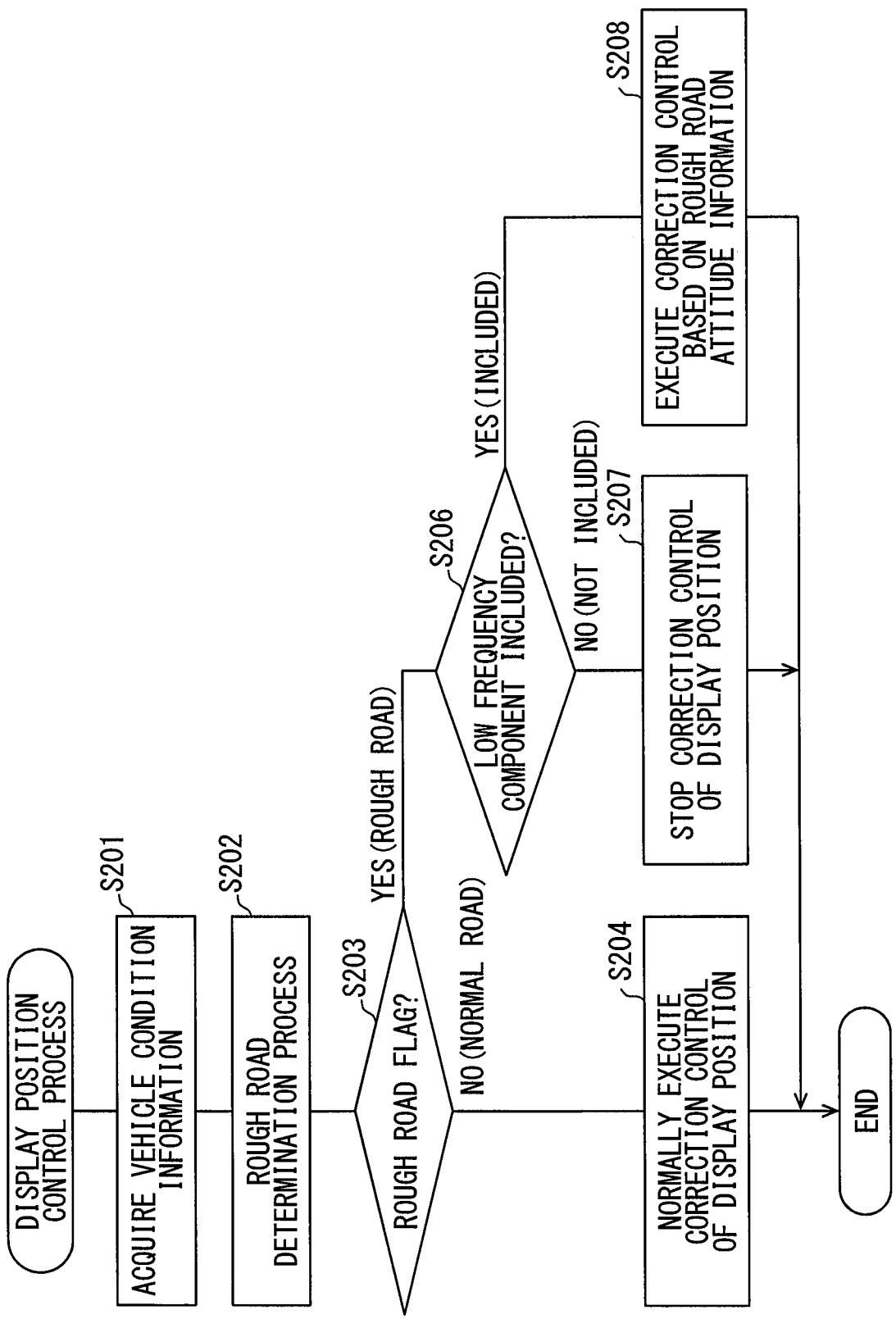
FIG. 10 is a flowchart showing a detail of a display position control process according to the second embodiment.
Figure 11:
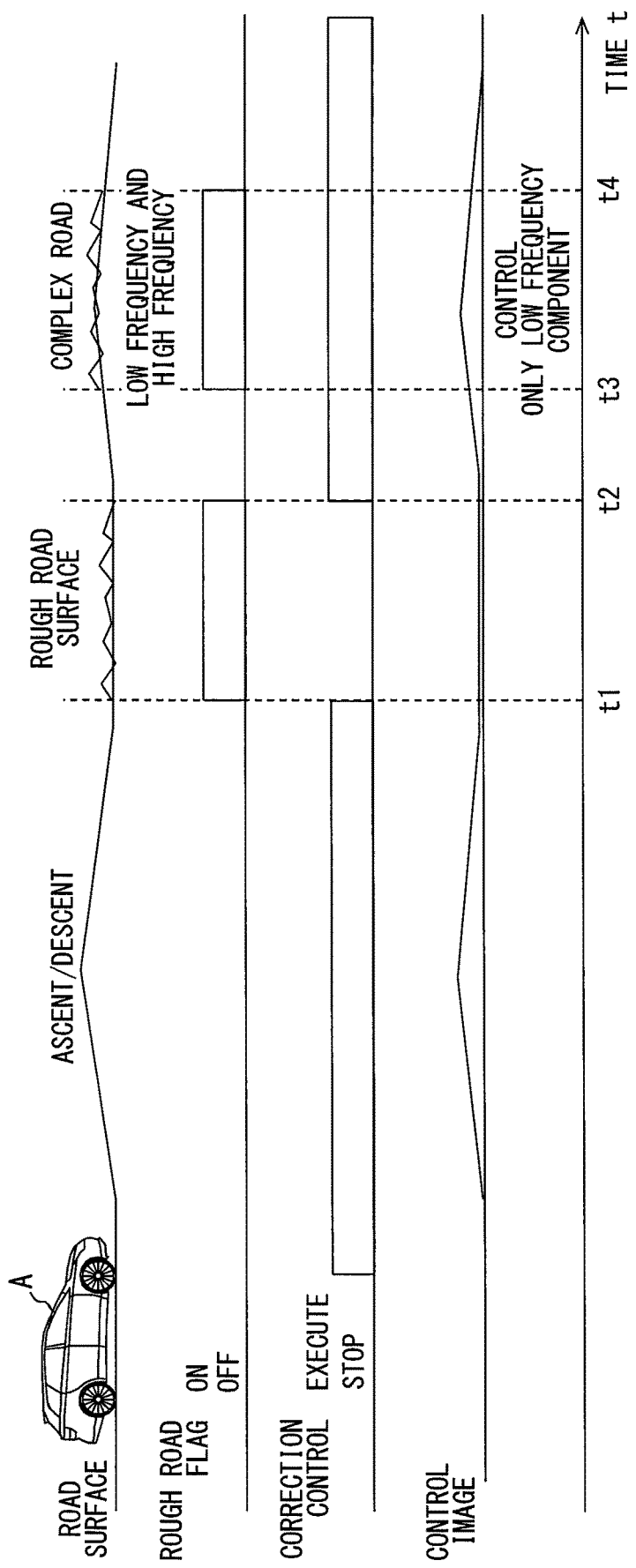
FIG. 11 is a time chart showing a transition of a control state according to a change of a road surface.

A second embodiment of the present disclosure shown in FIGS. 9-11 is a modification of the first embodiment. In the second embodiment, even when a rough road determination is made, depending on the state of the road surface, the correction control of the display position is continued with changing the control content. Hereinafter, the details of the display control process of the second embodiment in which the correction control is suppressed based on the rough road determination will be described with reference to FIG. 1.

As shown in FIG. 9, the specific frequency fs defining the lower limit of the rough road frequency band is set to be higher than the natural frequency fe in the second embodiment. The specific frequency fs is preset such that a Harshness vibration band generated in the vehicle A, specifically, a band of about 15 Hz to 30 Hz is included in the rough road frequency band. The information acquisition unit 32 removes information of the vibration that is less than the specific frequency fs from the information on the entire frequency band included in the measurement data, and extracts measurement data on the rough road frequency band as the vibration information.

In addition, the information acquisition unit 32 generates the rough road attitude information in addition to the attitude change information that is substantially the same as in the first embodiment. The rough road attitude information is attitude change information used for correction control by the position correction unit 37 during a period of traveling on a rough road. The information acquisition unit 32 generates the rough road attitude information using the vibration information of a low frequency band that is lower than the rough road frequency band.

The attitude change frequency fa that defines the upper limit of the low frequency band is set to be lower than the natural frequency fe. The information acquisition unit 32 extracts the vibration information of the low frequency band from each of the vibration information based on the measurement data of the angular velocity in the pitch direction and the vibration information based on the measurement data of the acceleration in the vertical direction, for example. The information acquisition unit 32 combines each vibration information in the low frequency band to generate rough road attitude information.

The rough road determination unit 33 determines whether the road on which the vehicle A is traveling is a rough road or a normal road, based on vibration information of a rough road frequency band defined in a higher range than the natural frequency fe. The rough road determination threshold value Thg is preset in the rough road determination unit 33. The rough road determination threshold value Thg is a threshold value to be compared with the gain of the rough road frequency band according to the second embodiment.

The rough road determination unit 33 switches on and off the rough road flag based on whether the gain of the rough road frequency band exceeds the rough road determination threshold Thg.

The correction suppression unit 38 stops the correction control of the display position of the far virtual image 41 by the position correction unit 37, based on the rough road determination of the rough road determination unit 33. When a rough road determination is made, the correction suppression unit 38 interrupts the correction control based on the attitude change information and controls the position correction unit 37 to perform the correction control based on the rough road attitude information. As described above, the position correction unit 37 interrupts the correction control of the display position with respect to the vibration in the rough road frequency band. On the other hand, the position correction unit 37 continues the correction control of the display position for canceling the vibration in the low frequency band, and continues to correct the positional deviation of the far virtual image 41 due to the gradient of the road surface and pitching of the vehicle A and the like.

Next, details of the display position control process of the second embodiment will be described with reference to FIG. 10. Here, S201 to S204 are substantially the same as S101 to S104 (see FIG. 7) of the first embodiment.

When it is determined in S203 that the rough road flag is set, the presence and absence of vibration of the low frequency component is determined based on the rough road attitude information in S206. In S206, when it is determined that the vibration of the low frequency component is substantially absent, the process proceeds to S207. For example, in a scene in which the vehicle A cruises on a rough road surface with no gradient at a constant speed, the process proceeds from S206 to S207. In S207, the correction control by the position correction unit 37 is stopped, and the display control process is temporarily ended.

On the other hand, when it is determined in S206 that the vibration of the low frequency component exists, the process proceeds to S208. For example, in a scene where the vehicle A travels on a complex road, the process proceeds from S206 to S208. In S208, the correction control based on the rough road attitude information is performed, and the display control process is temporarily ended.

The transition of the display control state based on the above display control process will be described based on the time chart shown in FIG. 11. Here, the control up to time t1, the control from time t2 to time t3, and the control after time t4 are substantially the same as in the first embodiment.

When the vehicle A enters a road area on a rough road surface at a time t1, a rough road flag is set by the rough road determination unit 33. At this time, the correction suppression unit 38 determines the presence or absence of the vibration of the low frequency component based on the rough road attitude information. The correction suppression unit 38 determines that there is substantially no vibration of the low frequency component based on the absence of a gradient in the road surface that the vehicle A enters at time t1. As described above, the correction control of the display position by the position correction unit 37 is canceled, the far virtual image 41 is moved to the specific display position, and the display is continued.

When the vehicle A enters the complex road at the time t3, the vibration of the low frequency band caused by the change in the gradient and the vibration of the high frequency band caused by the irregularity of the road surface occur in the vehicle A. At this time, the correction suppression unit 38 controls the position correction unit 37 to perform correction control based on rough road attitude information according to the presence of vibration of the low frequency component. As described above, the display position of the far virtual image 41 is corrected so as to cancel the vibration of the low frequency component, and follows the change in attitude due to the gradient of the complex road.

In the second embodiment described above, the correction control for correcting the shift of the display position of the virtual image 40 with respect to the foreground is not stopped but partially continued. Even with such control of the second embodiment, the same effect as that of the first embodiment is exerted, and it is possible to continue providing information for the occupant while ensuring the visibility of the virtual image 40.

In addition, in the second embodiment, the correction control for the vibration of the low frequency component is continued even while traveling on a rough road. Therefore, although the far virtual image 41 may be temporarily deviated from the object to be superimposed, the far virtual image 41 can be maintained the state in which the image 41 is properly superimposed on the object to be superimposed on a time average. According to the above, visibility of the far virtual image 41 can be ensured even while the vehicle is traveling on a complex road.

Third Embodiment

Figure 12:
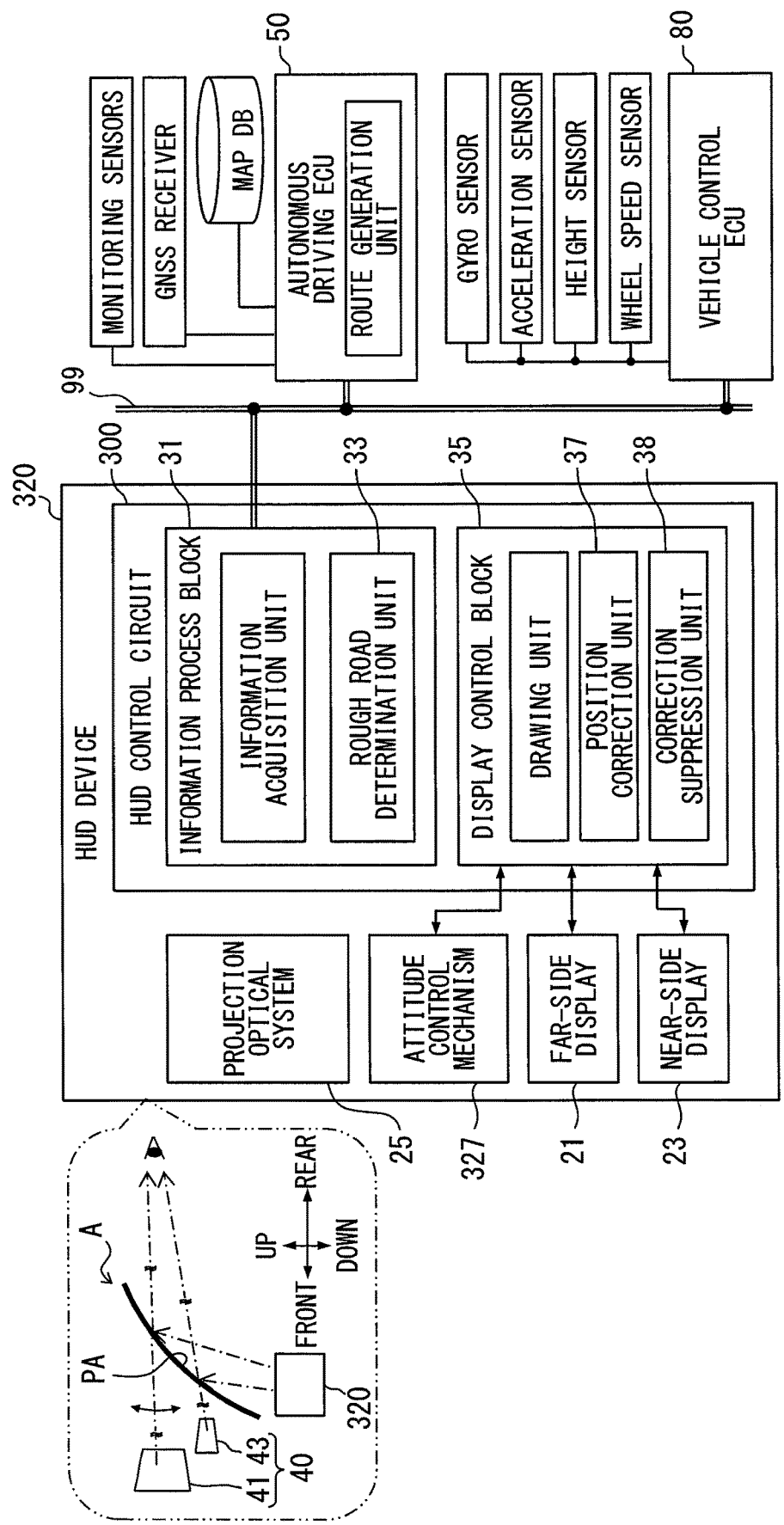
FIG. 12 is a block diagram showing a configuration related to virtual image display in the vehicular system of the third embodiment.

The third embodiment of the present disclosure shown in FIG. 12 is another modification of the first embodiment. The HUD device 320 of the third embodiment is provided with an attitude control mechanism 327 and a HUD control circuit 300 in addition to each display 21 and 23 and the projection optical system 25.

The attitude control mechanism 327 is a mechanism for controlling the attitude of the projection optical system 25. The attitude control mechanism 327 is configured integrally with at least one of the plurality of reflection mirrors included in the projection optical system 25, the one reflecting the light of the far display image. The attitude control mechanism 327 displaces the position at which the light of the far display image is projected in the projected area PA and thus the imaging position of the far virtual image 41 in the vertical direction by changing the attitude of the reflection mirror.

Similar to the HCU 100, the HUD control circuit 300 includes a plurality of processors and memory devices, and is connected to the autonomous driving ECU 50 and the vehicle control ECU 80 via a communication bus 99. The HUD control circuit 300 controls each processor to execute the display control program stored in the memory device, thereby constructing the information processing block 31, the display control block 35, and the like which are substantially the same as those in the first embodiment.

The position correction unit 37 controls the operation of the attitude control mechanism 327 based on the attitude change information. The position correction unit 37 maintains a state in which the far virtual image 41 is properly superimposed on the object to be superimposed by displacing the projection position of the far display image so that the attitude change of the vehicle A is compensated. The correction suppression unit 38 suppresses the attitude control of the attitude control mechanism 327 by the position correction unit 37 based on the rough road determination of the rough road determination unit 33.

Even when the control circuit for controlling the display position of the far virtual image 41 is built in the HUD device 320 as in the third embodiment described above, the same effect as that in the first embodiment can be obtained and the visibility of the virtual image 40 is ensured and it is possible to continue to provide information for passengers. In the third embodiment, the HUD device 320 corresponds to the "display control device".

Other Embodiment

Although a plurality of embodiments of the present disclosure have been described above, the present disclosure is not construed as being limited to the above-described embodiments, and can be applied to various embodiments and combinations within a scope that does not depart from the spirit of the present disclosure.

In the above embodiments, vehicle information and warning information related to autonomous driving and the like are displayed as far virtual images. However, the information provided through the virtual image may be changed as appropriate. Further, the design of the virtual image can be changed as appropriate. For example, the ACC target 42*b* may be in a display mode as shown in Modifications 1 to 4 shown in FIGS. 13 to 16.

Figure 13:
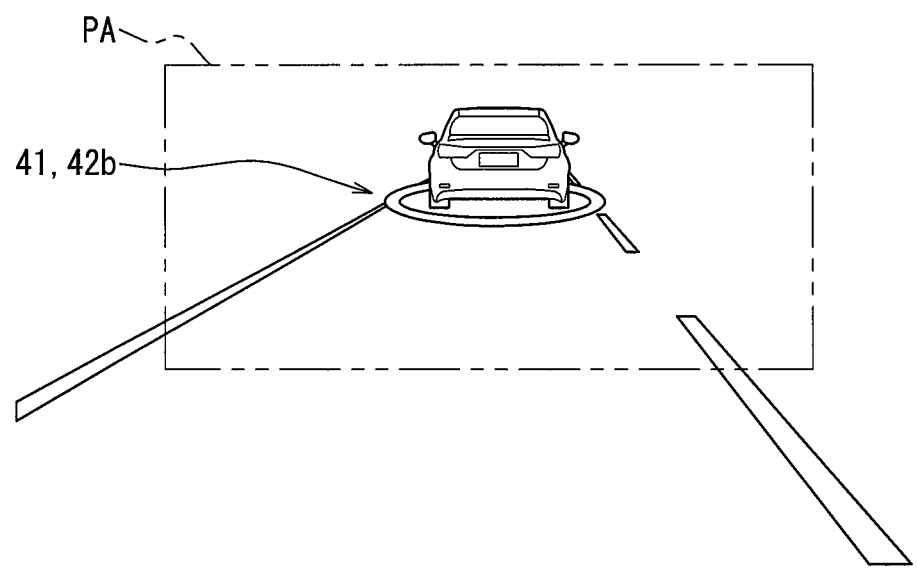
FIG. 13 is a diagram showing a first modification of FIG. 6.
Figure 14:
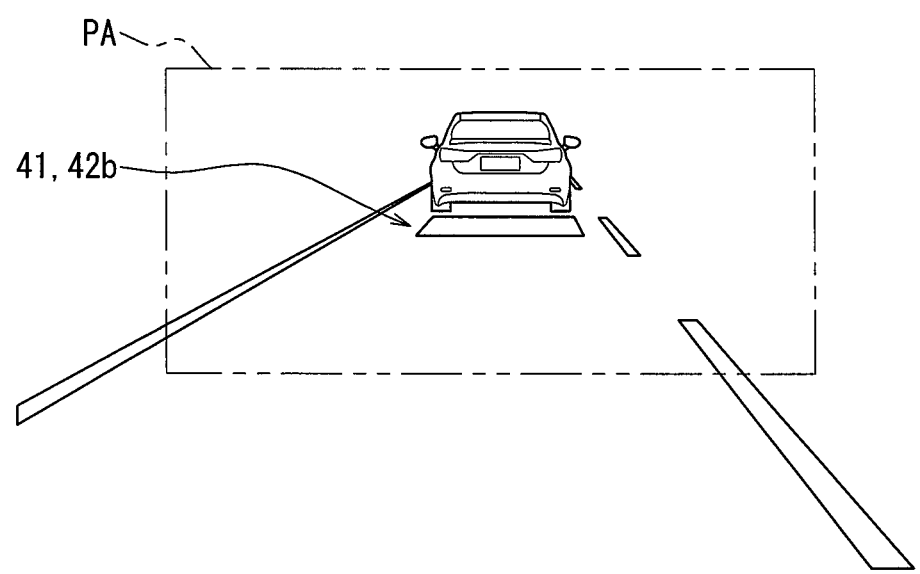
FIG. 14 is a diagram showing a second modification of FIG. 6.
Figure 15:
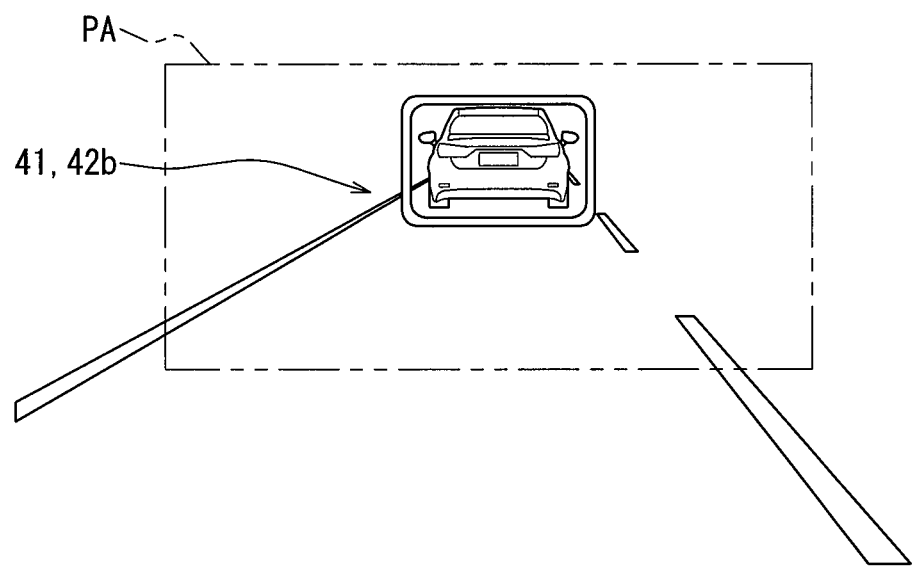
FIG. 15 is a diagram showing a third modification of FIG. 6.
Figure 16:
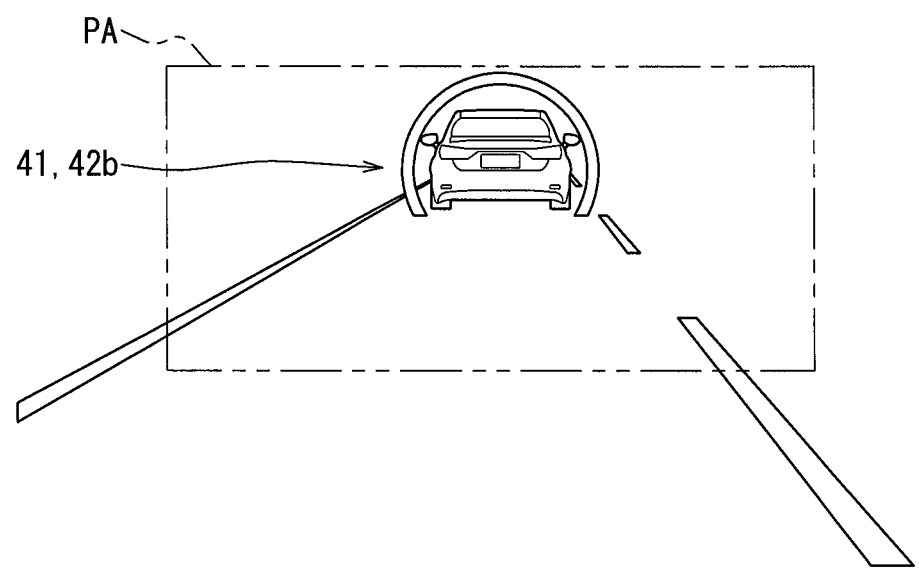
FIG. 16 is a diagram showing a fourth modification of FIG. 6.

The ACC target 42*b* of the first modification of FIG. 13 is drawn in a partial annular shape surrounding the road surface directly beneath the leading vehicle. The ACC target 42*b* of the second modification of FIG. 14 is drawn in a horizontally elongated rectangular shape that causes the road surface behind the leading vehicle to emit light. The ACC target 42*b* of the third modification of FIG. 15 is drawn in a horizontally elongated rectangular shape that surrounds the upper and lower and right and left sides of the leading vehicle in appearance from the occupant. The ACC target 42*b* of the fourth modification of FIG. 16 is drawn in a partial annular shape that covers an upper side of the leading vehicle. As in the first embodiment, the ACC target 42*b* of each modification is changed to an ambiguous display mode by a process such as reduction of area and reduction of luminance based on setting of the rough road flag.

In the above embodiments, based on the rough road determination, the display mode of the far virtual image is changed to an ambiguous form. Alternatively, it is not necessary to change the display mode of the far virtual image. Further, in the above-described embodiments, only the far virtual image is set as the control target of the position correction, alternatively both the far virtual image and the near virtual image may be controlled objects of the correction control for correcting the display position.

The HUD device of the above embodiments has a bifocal configuration for displaying a far virtual image and a near virtual image. Alternatively, the HUD device may have a multifocal configuration for imaging a virtual image at three or more focal points. Alternatively, the HUD device may be of a mono-focal configuration in which a virtual image is formed at one focal point. Further, the HUD device may be configured to be capable of moving the position of the focal point in the longitudinal direction of the vehicle.

In the above embodiments, the specific range of the high frequency band which is regarded as a rough road frequency band may be appropriately changed according to the vibration characteristics of the vehicle. Further, in the above embodiments, the rough road determination is performed by comparing the gain of the vibration of the rough road frequency band with the rough road determination threshold. Alternatively, the rough road determination method may be appropriately changed. For example, a rough road flag may be set when the attitude change amount in the pitch direction and the vehicle height change amount of each wheel exceed a predetermined threshold for a certain period.

In the above embodiments, the display position of the virtual image is corrected by moving the drawing position on the display surface or the screen, controlling the attitude of the reflection mirror of the projection optical system, and the like. Alternatively, the method of correcting the display position of the virtual image is not limited to these methods. For example, by moving the entire HUD device, the display position of the virtual image may be corrected. Alternatively, the display position of the virtual image may be corrected by shifting the far display device within the HUD device. Alternatively, by combining a plurality of correction methods, the display position of the virtual image may be corrected.

The method of suppressing the correction control based on the rough road determination may be appropriately changed. For example, the suppression of correction control may be realized by narrowing the movable range of the virtual image based on rough road determination. Alternatively, the movement of a virtual image that deteriorates visibility may be suppressed by restricting the movement speed of the virtual image based on the rough road determination. Alternatively, the control of displacement of the display position of the virtual image to the specific display position may be omitted in a manner that the correction control is completely canceled. In this case, the display position of the virtual image is immediately fixed at the display position at the time of determination based on the rough road determination.

The virtual image of the above embodiments is mainly displaceable in the vertical direction. Alternatively, the position correction unit may slightly rotate the virtual image so that the positional deviation caused by the rolling is corrected according to the rolling of the vehicle. Alternatively, the virtual image may be moved in the left-right direction.

In the above embodiments, the rough road determination process using measurement data of the gyro sensor and the acceleration sensor is mainly described, alternatively, the rough road determination may be performed using the measurement data of the height sensor. For example, when a vibration when the vehicle passes through a seam of a road is detected on the basis of the measurement data of a height sensor arranged on the front wheel, and the rough road flag is set immediately, the display position is fixed to the specific display position. As a result, it is possible to prevent the display position of the virtual image from being shifted upward or downward due to the fluctuation in the pitch direction after passing through the seam. Alternatively, the rough road flag may be set using the measurement data of wheel speed sensors arranged in each wheel. For example, when the variation of the rotation speed occurring on a rough road or the like is larger than a predetermined threshold value, it is determined that the travelling road is a rough road. Thus, the rough road determination may be performed based on measurement data of various sensors.

Various non-transitory tangible memory medium (i.e., non-transitory tangible storage medium) such as a flash memory and a hard disk may be used as the memory device of each electronic control unit. The storage medium for storing the display control program is not limited to the memory device arranged in the HCU. Alternatively, the medium may be an optical disk serving as a basis for copying the display control program to the memory device or a hard disk drive of a general purpose computer or the like.

The display control program and the display control method according to the present disclosure may be realized by a configuration different from that of the HCU 100 and the HUD device 320 of the above embodiments. For example, the functions of the display control device may be realized by a navigation device and an autonomous driving ECU mounted on the vehicle executing the display control program by the processor. Alternatively, a plurality of electronic control units may cooperate to execute the display control program and the display control method according to the present disclosure. Alternatively, the processing unit of the electronic control unit in which two or more functions of the HCU, the autonomous driving ECU, and the vehicle control ECU are integrated may execute the display control program and the display control method according to the present disclosure.

Here, the process of the flowchart or the flowchart described in this application includes a plurality of sections (or steps), and each section is expressed as, for example, S101. Further, each section may be divided into several subsections, while several sections may be combined into one section. Furthermore, each section thus configured may be referred to as a device, module, or means.

Although the present disclosure has been made in accordance with the embodiments, it is understood that the present disclosure is not limited to such embodiments and structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. A display control device for controlling a display position of a virtual image displayed and superimposed on a foreground seen from an occupant in a vehicle, the display control device comprising:
   a computer having a processor and configured to
   acquire state information indicating a state of the vehicle;
   extract attitude change information that indicates an attitude change of the vehicle and vibration information that indicates a vibration occurring in the vehicle from the state information;

correct a displacement of the display position of the virtual image with respect to the foreground caused by the attitude change of the vehicle, based on the attitude change information;

determine whether a road is a rough road, the road on which the vehicle is traveling or scheduled to travel, based on the vibration information; and suppress a correction control of the display position of the virtual image and continue to display the virtual image, in response to determining a rough road, wherein suppressing the correction control of the display position of the virtual image and continuing to display the virtual image includes stopping the correction control of the display position of the virtual image, displaying the virtual image at a specific display position, and continuing to display the virtual image at the specific display position, and the specific display position is at least one of
a display position where the virtual image is displayed in response to the vehicle traveling on a road without any gradient in a direction of vehicle travel, or
a lowermost position of a display range in which the virtual image is displayed.

2. The display control device according to claim 1, wherein:
the computer is further configured to change a display mode of the virtual image to reduce a display area and luminance of the virtual image, in response to determining the rough road.

3. The display control device according to claim 2, wherein:
the computer is further configured to
extract the vibration information in a rough road frequency band in which an amplitude increases as the vehicle travels on the rough road; and
determine whether the road is the rough road, based on the vibration information in the rough road frequency band.

4. The display control device according to claim 3, wherein:
the computer is further configured to
generate rough road attitude information as the attitude change information when travelling on the rough road, according to the vibration information in a low frequency band that is lower than the rough road frequency band; and
execute the correction control based on the rough road attitude information, in response to determining the rough road.

5. The display control device according to claim 1, wherein:
the virtual image includes a near virtual image and a far virtual image formed at a position farther from the vehicle than the near virtual image; and
the computer is further configured to
correct the displacement of the display position only for the far virtual image among the near virtual image and the far virtual image; and
suppress the correction control of the display position of the far virtual image, in response to determining the rough road.

6. The display control device according to claim 1, wherein:

at least one of a gyro sensor, an acceleration sensor, a vehicle height sensor, and a wheel speed sensor is mounted on the vehicle as an vehicular sensor; and
the computer is further configured to
acquire measurement data of the vehicular sensor mounted on the vehicle as the state information; and
acquire both the attitude change information and the vibration information from the measurement data.

7. The display control device according to claim 1, wherein:
the vehicle is equipped with an autonomous driving function for automatically driving the vehicle; and
the computer is further configured to suppress the correction control of the display position with respect to the virtual image for presenting vehicle information relating to an autonomous driving.

8. The display control device according to claim 1, wherein:
the computer is further configured to suppress the correction control of the display position with respect to the virtual image for presenting warning information to a driver of the vehicle.

9. A display control method for controlling a display position of a virtual image displayed and superimposed on a foreground seen from an occupant in a vehicle, the display control method, using at least one processor, comprising:
acquiring state information indicating a state of the vehicle and extracting attitude change information indicating an attitude change of the vehicle and vibration information indicating vibration occurring in the vehicle from the state information;

determining whether a road is a rough road, the road on which the vehicle is traveling or scheduled to travel, based on the vibration information;

correcting a displacement of the display position of the virtual image with respect to the foreground caused by the attitude change of the vehicle, based on the attitude change information; and suppressing a correction control of the display position of the virtual image and continuing to display the virtual image, based on a rough road determination, wherein suppressing the correction control of the display position of the virtual image and continuing to display the virtual image includes stopping the correction control of the display position of the virtual image, displaying the virtual image at a specific display position, and continuing to display the virtual image at the specific display position, and the specific display position is at least one of
a display position where the virtual image is displayed in response to the vehicle traveling on a road without any gradient in a direction of vehicle travel, or
a lowermost position of a display range in which the virtual image is displayed.

10. A display control method for controlling a display position of a virtual image displayed and superimposed on a foreground seen from an occupant in a vehicle, the display control method, using at least one processor, comprising:
acquiring state information that indicates a state of the vehicle;
extracting attitude change information from the state information that indicates an attitude change of the vehicle;
extracting vibration information from the state information that indicates a vibration occurring in the vehicle;

correcting a displacement of the display position of the virtual image with respect to the foreground, in response to determining the attitude change of the vehicle;

stopping a correction control of the display position of the virtual image and continuing to display the virtual image, in response to the vibration occurring in the vehicle matching a predetermined frequency; and displaying the virtual image to a specific display position and continuing to display the virtual image at the specific display position, in response to stopping the correction control of the display position, wherein the specific display position is at least one of
- a display position where the virtual image is displayed in response to the vehicle traveling on a road without any gradient in a direction of vehicle travel, or
- a lowermost position of a display range in which the virtual image is displayed.

11. The display control method according to claim 10, further comprising:

changing a display mode of the virtual image to reduce a display area and luminance of the virtual image, in response to the vibration occurring in the vehicle matching the predetermined frequency.

* * * * *